(12) United States Patent
Lucas

(10) Patent No.: US 6,513,307 B1
(45) Date of Patent: Feb. 4, 2003

(54) METHOD FOR SHEATHING BALES OF PLANTS AND EQUIPMENT FOR IMPLEMENTING SAME

(75) Inventor: Gerard Lucas, La Verrie (FR)

(73) Assignee: Lucas G, La Verrie (FR)

(*) Notice: Subject to any disclaimer, the term of this patent is extended or adjusted under 35 U.S.C. 154(b) by 0 days.

(21) Appl. No.: 09/530,430

(22) Filed: Jul. 14, 2000

(51) Int. Cl.⁷ .............................. B65B 9/15; B65B 43/56
(52) U.S. Cl. .............................. 53/459; 53/469; 53/567; 53/576
(58) Field of Search .......................... 53/567, 576, 469, 53/459

(56) References Cited

U.S. PATENT DOCUMENTS

| | | | |
|---|---|---|---|
| 4,606,176 A | * 8/1986 | Cundall | 53/576 |
| 4,888,937 A | * 12/1989 | Glenn | 53/576 |
| 4,938,006 A | * 7/1990 | Korsgaard | 53/576 |
| 4,945,715 A | 8/1990 | Brodrecht | |
| 5,003,754 A | * 4/1991 | Stirling | 53/576 |
| 5,425,221 A | * 6/1995 | Pronovost | 53/567 |

FOREIGN PATENT DOCUMENTS

| | | |
|---|---|---|
| EP | 0 111 434 | 6/1984 |
| EP | 0 842 597 | 5/1998 |
| FR | 2 744 420 | 8/1997 |
| GB | 2 195 605 | 4/1988 |
| GB | 2 227 220 | 7/1990 |
| WO | WO 96/41514 | 12/1996 |

* cited by examiner

Primary Examiner—John Sipos
(74) Attorney, Agent, or Firm—Young & Thompson

(57) ABSTRACT

A sheathing method includes the steps of depositing a bale on a sheathing carrier. The bale is pushed onto the carrier and slides on the carrier base plate against the preceding bale using a pusher-ejector device. A pushing motion of the pusher-ejector device causes a handling equipment to simultaneously move the tractor attached to the handling in a direction opposite to the direction of the pushing motion. The movement of the tractor is caused by a cross piece arranged beneath the frame of the pusher-ejector device. The carrier has a stop integral with the two rails that define the base plate. The cross piece contacts the stop to move the carrier by a step corresponding to a length of the bale in the same direction as the tractor.

16 Claims, 4 Drawing Sheets

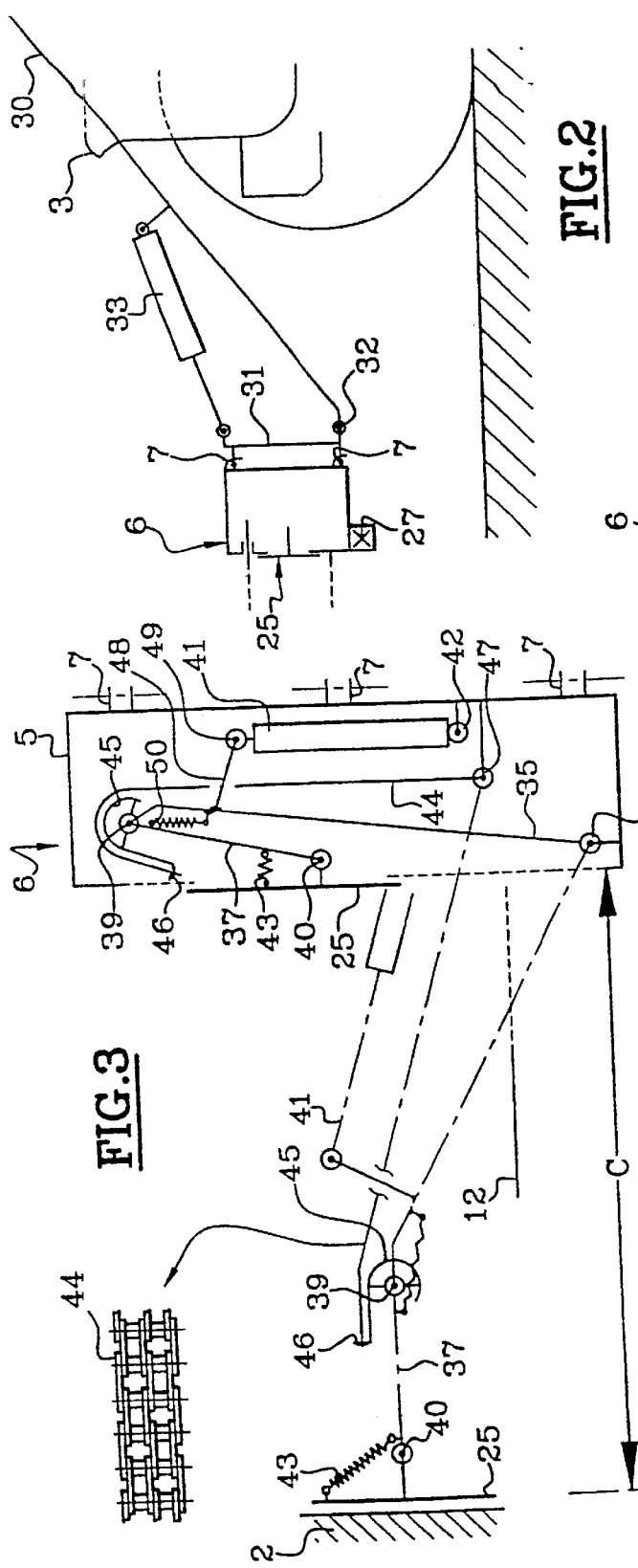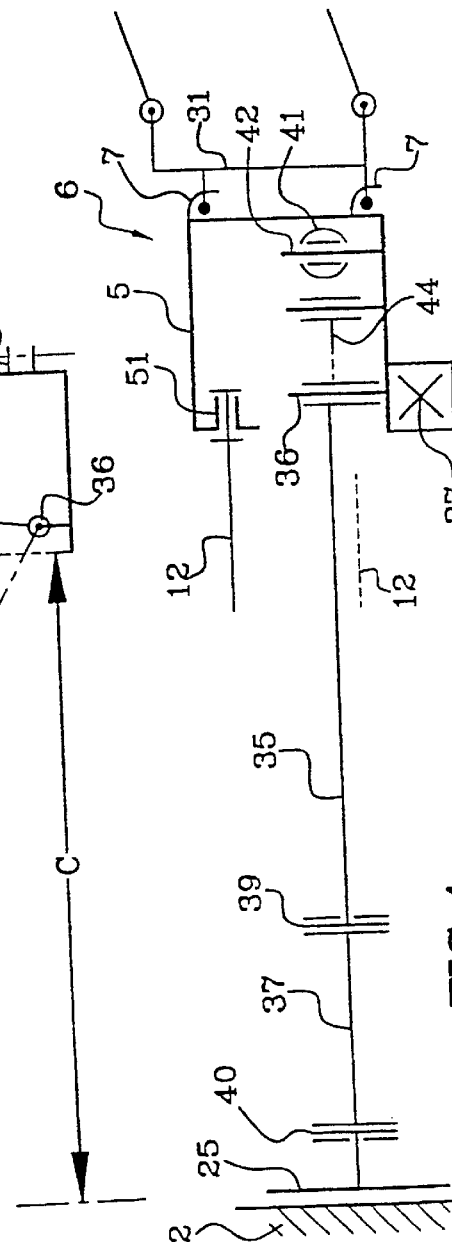

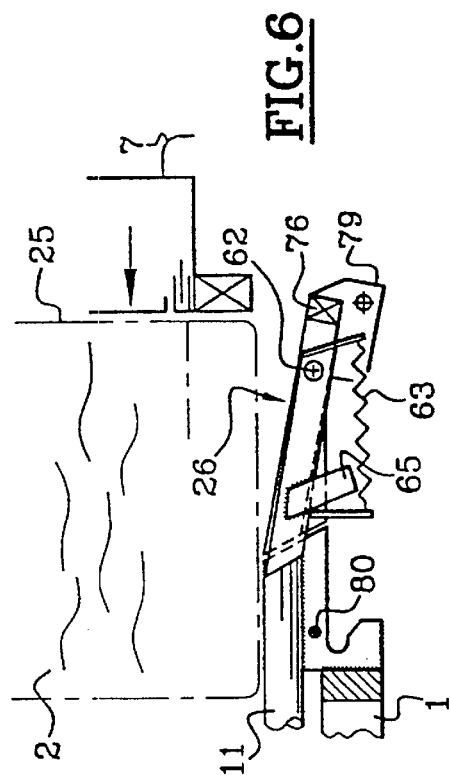
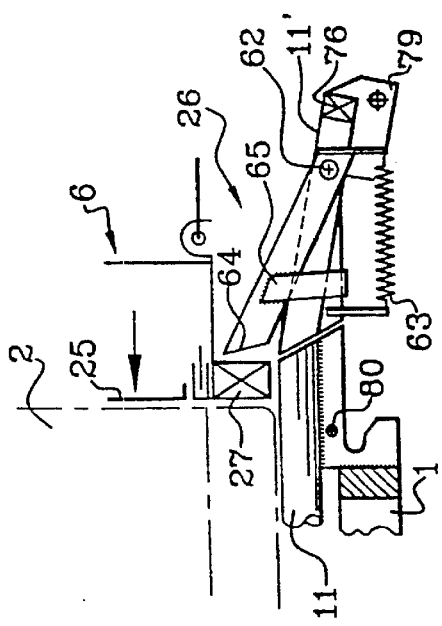
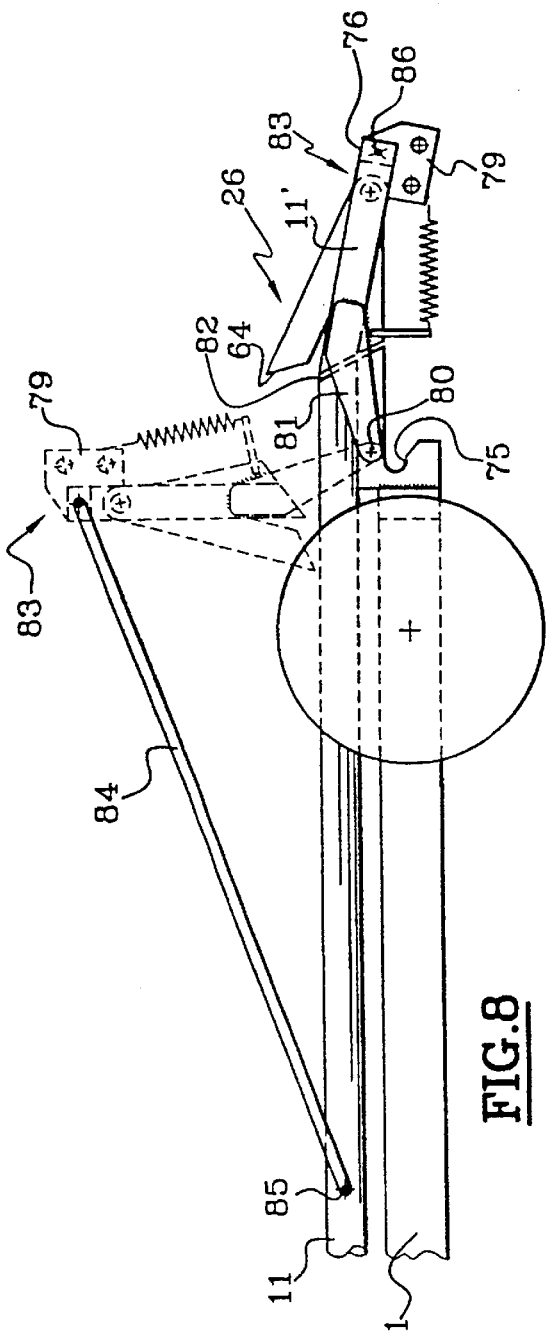
*FIG.6*
*FIG.7*
*FIG.8*

METHOD FOR SHEATHING BALES OF PLANTS AND EQUIPMENT FOR IMPLEMENTING SAME

BACKGROUND OF THE INVENTION

This invention concerns a method for sheathing bales of plants, fodder or other, under a plastic film.

This invention also relates to the material used for sheathing bales of plants, fodder or other, under plastic film, round bales as well as parallelepipedic bales.

This material consists on the one hand of a storing and drawing frame for the plastic film in order to form a kind of funnel, as described in the document CA-111 546 for round bales and, on the other hand, loading means that enable placing the bales one after the other into said funnel.

The drawing frame is mounted on a carrier that is, moreover, suitably arranged upstream of said drawing frame, for accommodating, centring and guiding each bale as it is pushed into the funnel whose inlet is formed and held open with sufficient diameter by said drawing frame.

The carrier can be moved as the bales are inserted, as described in the document GB-2 227 220, by a step corresponding to the length of these bales, directly by the vehicle that handles the bales, i.e. a transport vehicle such as a farming tractor fitted for example with a loading arm or similar.

Handling these bales on the fields does not enable accurate positioning of the bales on the carrier or reliable sheathing; the latter operation calls for a certain skill on the operator's part.

SUMMARY OF THE INVENTION

This invention suggests means that enable simplification of this sheathing operation and especially ensure fast execution of said operation.

Besides, the method according to the invention enables improvement of the compacting of the bales with respect to one another inside the sheath. Preferably, this sheath is made of plastic material; it is preferably stretched to enable insertion of the bales and then, after leaving the drawing frame, it resumes its normal position while compressing the periphery of the bales.

The sheathing method according to the invention using a sheath-carrier that moves as the sheath is being filled, consists:

in handling a bale by means of a transport vehicle fitted with a handling tool that is for instance equipped with spindles, in laying the bale on the carrier, upstream of the plastic film storage supports making up said sheath, in pushing the bale inside the sheath, resting against the previous bale, in moving the carrier by a step matching the length of the bale, which operation that consists in pushing the bale uses the handling tool equipped to that effect with a pusher-ejector device whose movement causes, by reaction, the reverse motion of said vehicle by means of said handling tool, whereas said tool is arranged to drive and move the sheathing carrier simultaneously over a distance corresponding to the length of the bale laid last on said carrier.

This method enables using a relatively simple tool. The sheathing carrier does not need any permanent energy source. It has a passive role throughout the sheathing operation.

The invention also relates to the handling tool mounted on a vehicle such as a farming tractor or similar, for implementing the method, which tool comprises a frame on which is mounted at least a pair of spindles, a pusher-rejector integrated to the spindle-carrying frame, behind said spindles, which frame comprises fastening means to the three-point coupling system, at the front or the rear of the tractor or still, according to the situation, to the end of a loading arm with which said tractor is equipped.

According to a preferred embodiment of the invention, the pusher-ejector device consists of a pair of compasses retracted inside the frame of the handling tool and that extend under the effect of a hydraulic actuator, for instance, controlled form the tractor by the operator, the pair of compasses extend over a distance that is at least equal to the length of the bale, in order to eject said bale from the spindles and to move simultaneously by reaction, the tractor and the sheathing carrier by a step corresponding to the distance travelled by the pusher, i.e. at least the length of the bale ejected.

Still according to the invention, the pair of compasses consist—of a first leg whose length corresponds more or less to the width or the diameter of the bale, which leg is articulated at one of its ends on an axle integral with the spindle-carrying frame and, —of a second leg articulated at the other end of the first leg, and that is fitted at its free end, with a pusher centered more or less on the longitudinal axis of the tractor, which first leg is mobile under the effect of an actuator that is mounted don the spindle-carrying frame and this first leg causes, when moving, the second leg to extend so that said pusher remains more or less centered on said longitudinal axis throughout its travel.

Still according to the invention, the second leg extends using a chain or cable that winds around a pulley section that is centered on its axis of articulation, at the end of the first leg of the pair of compasses, which cable is integral at one of its ends, with said sector of the second leg and at its other end, with the spindle-carrying frame at one point selected to enable displacement of the pusher along the longitudinal axis of the tractor, i.e. along a line more or less on the middle vertical plane of the spindles, or still the middle vertical plane of the bale to be laid on the sheathing carrier and picked up by said spindles.

Under certain operating conditions, the cable of the pusher may become slack and leave its guiding system at the angle of the pair of compasses.

This invention suggests using a roller chain, a double chain for instance, to ensure extension of the pair of compasses, which double roller chain advantageously maintains high stiffness on a plane that is perpendicular to the axis of its rollers, i.e. on the extension plane of the pair of compasses, which plane is for example horizontal.

Still according to the invention, the spindle-carrying frame comprises at its lower section, a crosspiece in the form of a heel or shoe that, on the one hand, serves as a marker to the operator with respect to the ground, to enable accurate spindling of the bales and, on the other hand, serves as a coupling means for pulling the sheathing carrier, by reaction during the ejection of the bale pushed onto the spindles, which member co-operates to that effect with a stop integral with said carrier.

The invention also concerns the sheathing carrier for implementing the method, which carrier co-operates with the handling tool and comprises, upstream of the drawing frame, a kind of base plate consisting of the upstream section of the rails integral with the frame of said carrier, and that extend over a length equal to at least twice the length of a bale, which rails are cantilever at their downstream end, i.e. on the sheathing side, and they comprise a fixed or removable stop system at their upstream end that co-operates with the heel or shoe of said tool in order to move said carrier by reaction, when the bale is ejected by means of the pusher of said handling tool.

According to another embodiment of the invention, the position of the stop on the rails is adjustable to suit the length of the bales and these rails may also comprise a second stop arranged downstream, preferably removable to enable sheathing of the last bale for example; this second removable stop is situated at a distance from the upstream stop that is at least equal to the length of a bale.

Taking into account the size and the weight of the bales, the invention suggests a stop system that makes handling of the bales easier, and in particular their placement on the carrier.

To that effect, the carrier comprises an area for laying the bales in the form of a base plate, made preferably of two rails separated by a distance that corresponds more or less to the radius of said bales; these guiding rails are situated as low as possible with respect to the ground and are extended downstream of the base plate in order to form a tilted plane at the inlet of the carrier; the space between the upstream extensions of the rails is able to accommodate a plate that co-operates to guide the bales as they are positioned by the tractor and the tool associated with said tractor. This guiding plate is articulated around a transversal and horizontal axis arranged at the upstream end of the legs of the rails, maintained elastically in a protruding position and capable of being retracted automatically when a bale is inserted. This plate also serves as a stop system and co-operates with the handling tool. The latter comprises a crosspiece in the form of a heel or shoe that retracts the plate automatically, and the latter can play a warning role as it resumes its normal stop positions soon as the handling tool has reached its normal bale unloading position. In this position, the stop is interposed between the crosspiece of the frame of the handling tool and the tractor vehicle, which causes during the ejection of the bale, by simple reaction, i.e. when the pusher of said tool rests on the bale, the tractor and the carrier simultaneously to move back, whereas the tractor is pushed directly by the frame of the handling tool whereas the carrier is pulled by said frame thanks to the stop installed upstream of said carrier.

Such arrangement of the inlet of the carrier with a stop in the form of a guiding late, limits vertical displacement of the bale and of the handling tool to the strict minimum.

The frame of the handling tool comprises, on the side of the tractor vehicle, means that enable to fasten it directly to the three-point coupling system of said tractor, as well to the rear or to the front of the tractor according to the equipment of said tractor, or to a carrier device mounted at the front of said tractor.

Moreover, this handling tool may fit other bale handling means such as for instance a barrel-type loading device such as described in the document FR-2 530 117; in such a case, there are as many handling tools as bales, for example three tools arranged in a star pattern.

Still according to the invention, the upstream section of the rails carrying the stop, forms a kind of frame that is articulated on said rails or the chassis of the carrier, around a horizontal and transversal axis, which frame is foldable at a right angle and lockable in this retracted position by means of tension rods or similar and said chassis and said frame are arranged to enable fastening of said carrier to the conventional three-point coupling system of a tractor in order to move the carrier as required. In such a case, the handling tool can be placed on the carrier, to be transported by the latter.

According to another embodiment of the invention, the carrier comprises at the guiding rails, guides to protect the plastic film during the introduction of the bales, which guides also enable centering of the bales in the funnel formed by the plastic sheath stretched on the drawing frame arranged on the carrier.

Still according to the invention, the chassis of the carrier is arranged in order to place the guiding rails of the bales as close to the ground as possible. In their upstream section, the rails are situated at a height compatible with the normal lifting capacity of a tractor when the latter is fitted with a handling tool fixed directly to its three-point lifting system. In their downstream section, the rails are situated a few centimetres above the ground, no more than 10 cm, so that generally these rails form a guiding plane that delineates an angle S with respect to the ground of approximately 5 to 7°.

The equipment according to the invention is also advantageously compact. The length of the guiding rails of the bales, downstream of the stop, is approximately twice and a third of the bales.

BRIEF DESCRIPTION OF THE DRAWINGS

The invention will also be detailed using the following description and appended drawings given for exemplification purposes, and on which:

FIG. 2 shows an assembly variation of the handling tool that is carried by a lifting arm with which a farming tractor is equipped;

FIG. 3 represents, in the form of a functional diagram, the elements making up the handling tool with the pair of compasses in retracted and extended positions;

FIG. 4 represents a lateral view, and still in the form of a functional diagram, of certain elements making up the handling tool, with the pair of compasses in an extended position;

FIG. 6 is a schematic diagram of the front section of the carrier showing the upstream end of the guiding rails, and the stop in a position retracted by a bale that is carried by the handling tool;

FIG. 7 shows the stop in active position when the bale rests on the carrier, before implementing the pusher;

FIG. 8 shows the system arranged at the front of the carrier to enable fastening it to a three-point coupling of a tractor.

DESCRIPTION OF THE PREFERRED EMBODIMENTS

Figure 1:
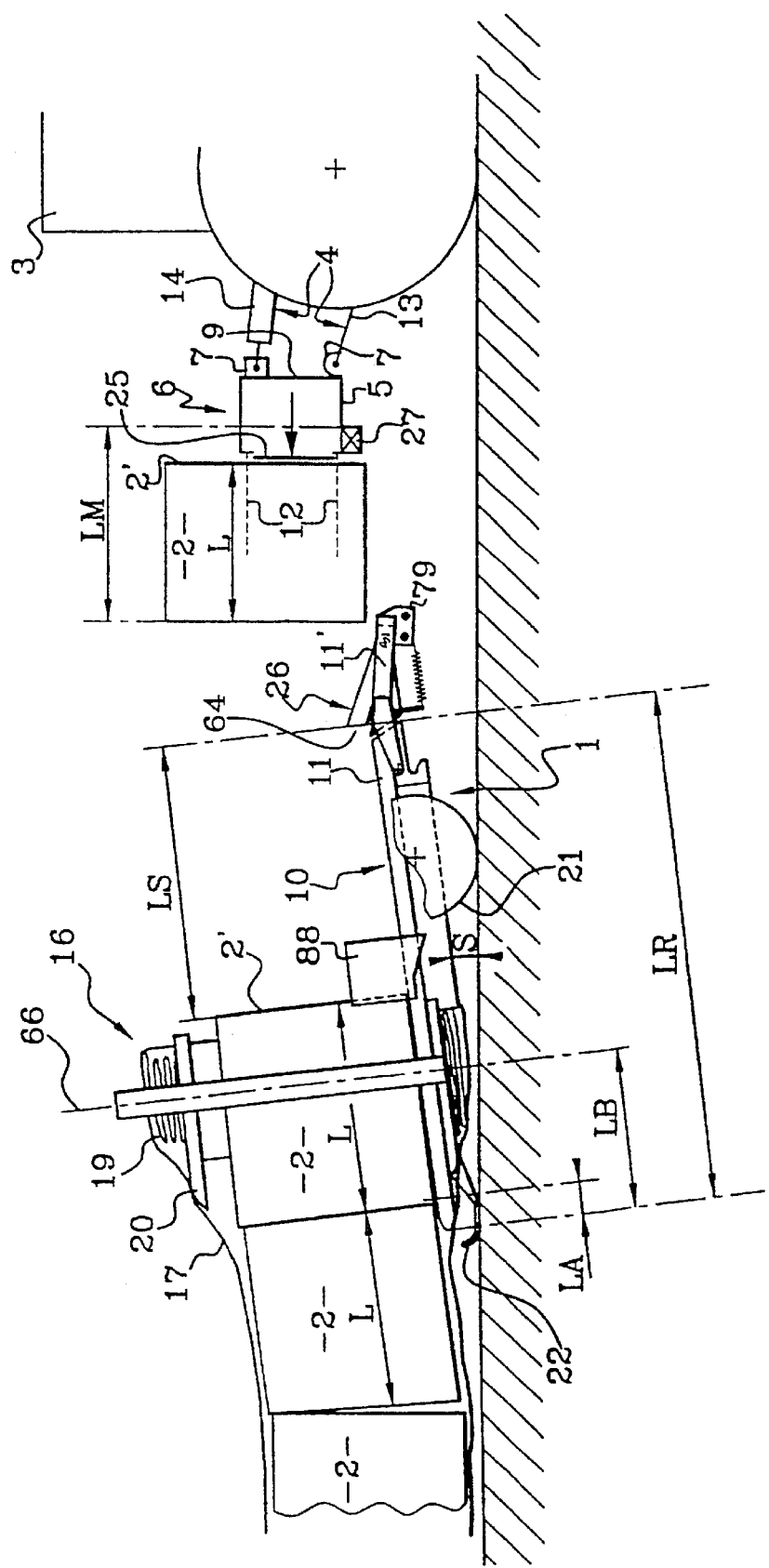
FIG. 1 represents, in a schematic lateral view, the sheathing carrier with the portion of a farming tractor fitted with a bale handling tool.

FIG. 1 shows schematically the carrier 1 on which lie bales 2 that are fed by a tractor 3.

The tractor 3 comprises, conventionally, a three-point type coupling system 4 on which is mounted the frame 5 of a tool 6 enabling to handle the bales 2. The three-point coupling system co-operates with anchoring points 7 arranged on the vertical face 9 of the frame 5.

The three-point coupling system 4 has sufficient clearance to collect the bales 2 on the ground and to raise them to sufficient height before presenting them to the inlet of the carrier 1, on a base plate 10 consisting for example of a pair of rails 11 arranged longitudinally.

The frame 5 of the handling tool comprises spindles 12 that engage into the bale 2 halfway up. An additional spindle 12, arranged at the lower section of the frame 5, can engage into the lower section of the bale, to improve its stability with respect to the handling tool.

The length of these spindles is for example approximately half the length of a bale 2.

The three-point coupling system comprises, conventionally, two lower coupling bars 13 and according to the handling requirements, a third telescopic point consisting of an actuator 14.

This actuator 14 enables tilting the frame 5 of the handling tool 6 as required to assist, for instance, the placement of the bales on the carrier, before the drawing frame 16.

The bales 2 are placed one behind another in a sheath 17. This sheath 17 is stored in the form of superimposed layers 19 at the drawing frame 16, which layers are carried by supporting arms 20 arranged for instance in such a fashion as to form a six-sided polygon for sheathing round bales or to form a square for sheathing parallelepipedic bales. These supporting arms 20 pull the layers 19 of the sheath apart, thereby forming a kind of funnel to enable the passage of the different bales 2.

The carrier 1 is capable of moving on the ground. It comprises to that effect wheels 21 arranged at the base plate 10 and, at the rear, it may comprise pads 22 and/or wheels as well. Preferably, the frame of the carrier and its rails 11 are tilted with respect to the ground by an angle S of 5–7° for example and the downstream end of said rails is very close to the ground, a few centimetres, ten or so, to enable smooth formation of the sheath and of the bale 'sausage'.

The handling tool 5 compromise a pusher 25 detailed below in relation to FIGS. 3 and 4, which pusher resses the bale 2 against the bale laid previously that is situated downstream of the drawing frame 16. When the pusher 25 touches and bears against the face 2' of the bale that it is carrying, it rests on the latter and it is the frame 5 of said pusher 25 that moves by reaction, driving the tractor 3 and the carrier 1 that, as it moves, unwind the layers 19 automatically in order to pack up the last bales.

The travel C of the pusher 25, FIG. 3, corresponds at least to the length of a bale 2 and the length of the guiding rails 11 is greater than twice the length of a bale. The rails 11 can also be extended at their downstream section in order to hold the bale longer, once it has left the drawing frame 16.

The displacement of the carrier 1 by reaction is caused by the presence of a stop 26 arranged upstream of the base plate 10 between extensions 11' situated at the front end of the rails 11. This stop 26 co-operates with a crosspiece 27 arranged under the frame 5 of the handling tool. When the bale 2 carried by the tool is fed onto the base plate 10, this crosspiece 27 extends above the upstream end of the rails 11, between the face 2' of the bale 2 in question and the active section of the stop 26 detailed below.

FIG. 2 shows an assembly variation of the handling tool 6. Said tool is fixed on a loading arm 30 mounted conventionally at the front of the tractor 3. This arm 30 comprises at its front end a plate 31 whose movement around the axis 32 is controlled by an actuator 33. The anchoring points 7 of the tool 6 are attached to the plate 31 provided to this end.

The operation of the handling tool 6 is the same, whatever its situation on the tractor, which tractor may besides comprise several tools provided at the front and at the rear.

FIGS. 3 and 4 represent in the form of functional diagrams, the handling mechanism of the pusher of the tool 6.

The movement of the pusher 25 is obtained for instance by means of a compass-type device comprising a pair of compasses accommodated in the spindle-carrying frame 5. These pair of compasses that are advantageously compact, consist of a first leg 35 whose length is close to the width or the diameter of the bale 2 if the bale is round. This leg 35 is articulated on an axle 36 integral with the frame 5. This first leg is initially vertical and comprises at its free end a second leg 37 articulated around an axis 39 provided at the end of said first leg, which second leg 37 comprises at its other end, the pusher 25 mounted on an axle 40.

The first leg 35 us mobile by means of an actuator 41 that is attached to an axle 42 integral with the frame 5. The operator controls this actuator from the tractor. The extension of the first leg 35 around its articulation axis 36 causes the second leg 37 to pivot round the axis 39 that is common with the first leg 35.

The purpose of this pivoting is to maintain the pusher 25 and in particular its axle 40 on the longitudinal axis of the tractor, which axis also corresponds to the middle vertical plane of the carrier when the loader has laid a bale on said carrier.

The pusher 25 is articulated on the axle 40 and held by a low tension spring 43 that tends to bring it back to the leg 37.

The co-ordinated movement of the legs 35 and 37 of the pair of compasses is performed using a cable or a chain 44, that reels around a circular sector 45 in the form of portion of a pulley or of a pinion for instance; this sector 45 is centered on the articulation axis 39, integral with said second leg. The cable or chain is attached at its end 46 on an extension of the sector 45, in an adjustable fashion and at its other end to a fixed point 4 integral with the frame 5, which point 47 is selected in order to obtain quasi-rectilinear displacement of the pusher 25, along the longitudinal axis of the tractor, as mentioned previously.

It can be noted that a large portion of the cable 44 is situated between the first leg 35 and the actuator 41.

The link between the actuator 41 and the leg 35 uses a cap 48 through which runs the chain 44, and the actuator 41 is articulated on this cap by means of an axle 49.

A return spring 50 is interposed between the first and the second leg to maintain the cable 44 in traction and to enable automatic return of said second leg.

The chain 44 consists preferably of a double roller chain as represented separately on FIG. 3. This roller chain is advantageously rigid on a plane that is perpendicular to the axis of its rollers, which plane corresponds to the spreading lane of the pair of compasses, i.e. a horizontal plane.

FIG. 4 also shows the spindles 12 that are integral with the frame 5, locked in orifices 51. The pusher 25 extends between both spindles 12 below the level of the latter for example.

It can be noted on FIG. 3 that the travel C of the pusher 25 between its inactive position where it is situated on the plane of the assembly face of the spindles 12 and its active position when the dihedron consisting of the leg 35 and the leg 37, is completely extended under the effect of the actuator 41 and of the chain 44.

This travel C is first of all vastly greater than the length of the spindles 12 to enable ejection of the bale and, as mentioned previously, it is greater than the length of the bales 2, for example approximately one and a quarter times the length of the bales 2.

The first leg 35 is articulated on the axis 36 that is integral with the spindle-carrying frame 5. The anchoring point 47 of the chain or of the cable 44 can still be seen, as well as the axle 42 on which is articulated the actuator 41 that serves for controlling the first leg 35.

The first leg 35 is articulated on the axle 36 that is integral with the spindle-carrying frame 5. The anchoring point 47 of the chain or of the cable 44 can still be seen, as well as the axle 42 on which is articulated the actuator 41 that serves for controlling the first leg 35.

FIG. 1 shows that the upstream extensions 11' of the rails are tilted towards the ground, forming a kind of ramp to assist the insertion of the bale 2. Between these extensions 11', we can see, as represented on FIG. 5 as well, the stop 26 that is in the form a rectangular plate filling up the space between the extensions 11'. This stop serving as a guide is articulated on a horizontal transversal axle 62, at the front end of the extensions 11'. An elastic return system in the form of a spring 63 enables holding the stop 26 in active position, i.e. in such a position that its downstream end face 64 can grab the crosspiece 27 of the frame 5, as represented on FIGS. 1 and 7.

Tabs 65, visible on FIGS. 6 and 7, limit the travel of the stop 26 when it comes back into active position after the passage of the tool 6 and in particular of its crosspiece 27. Sudden return of the stop 26 to active position is indicated by a characteristic warning clatter, that informs the operator and enables him to initiate the bale ejection and sheathing procedure.

FIG. 1 shows the length LR of the rails 11 between the active face 64 of the stop 26 and the downstream end of said rails.

This length LR is approximately twice and a third the length of the bales 2. It comprises the length of the base plate LS, plus the length of a bale L and an additional rest LA for the sheathed bale in order to maintain said bale in an intermediate position between the ground and the carrier.

The length LS of the base plate 10, between the face 2' of the bale that is situated in the drawing frame 16 and the active face 64 of the lock 26, is substantially greater than the length LM of a bale increased by the distance between the pusher 25 and the active face of the crosspiece 27 of the handling tool. These different alterations enable to obtain a compact and particularly efficient equipment.

The transversal middle axis 66 of the drawing frame 16 is situated at a distance LB from the downstream end of the rails 11 that is approximately equal to one third of their length LR.

FIG. 8 shows additional means provided at the front of the carrier 1, i.e. in its upstream section, to assist its displacement on the ground, by means of the tractor.

The front end of the frame of the carrier 1 comprises anchoring points 75 that co-operate for example with the lower lifting arms 13 of a conventional coupling system. The third anchoring point is provided at the front end of a transversal bar 76 that connects the upstream ends together of the extensions 11' of the rails 11.

The third point 79 is provided on this crosspiece 76, in its central section.

Figure 5:
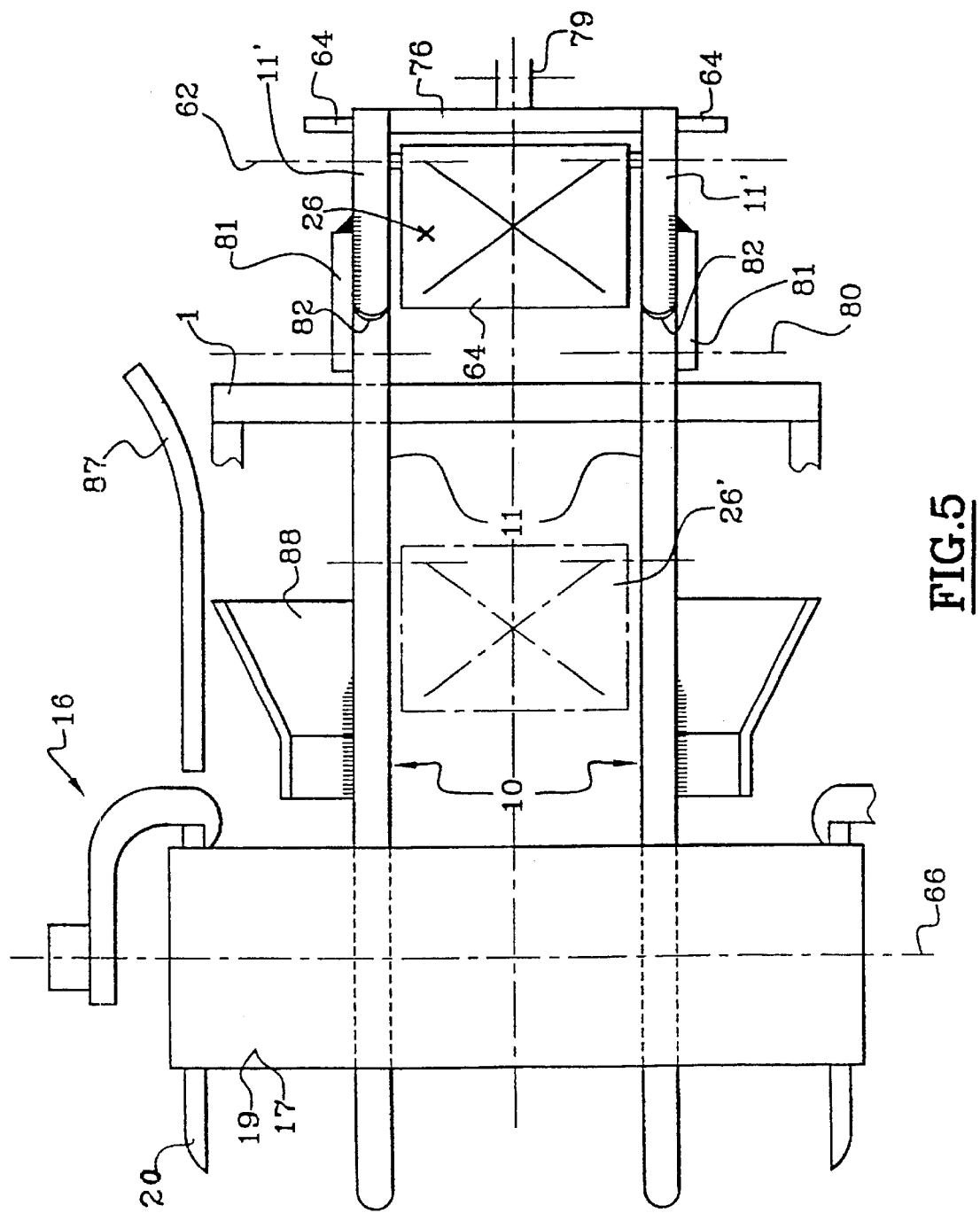
FIG. 5 is a schematic diagram of the carrier seen from above, with notably the drawing frame, the guiding rails and the stop system.

The extensions 11' form with the crosspiece 76, a kind of frame, FIG. 5, that is articulated around an axle 80 arranged horizontally and transversally above the level of the hooks 75. The extensions 11' are mounted on the caps 81 articulated on the axle 80 and the rails 11 are cut slantwise.

The position of the cuts 82 of the rails 11 and that of the axle 80 are such that they enable the front end of the assembly consisting of the extension 11', of the stop 26 and of the third point 79 to be tilted vertically. In such a position, this assembly is held by means of tension rods 84 interposed between these axles 85 arranged laterally on the rails 11 of the carrier or on the frame of said carrier, and axles 80 arranged for example at the ends of the crosspiece 76.

The sheathing carrier can be handled notably to install it on the site or to start a new sausage-like silo.

Handling can also take place upon completion of an on-site operation and then, the handling tool can be dismantled and laid on the carrier.

Additional bars 87 arranged halfway up the bale can also be provided, on either side of the bale, for improved guiding and insertion into the drawing frame without any possible damage of the plastic film of which the sheath is composed.

Similarly, at the lower section of the base plate 10, as represented on FIGS. 1 and 5, guides 88 can be placed, that enable locking and guiding the bale 2 at the inlet of the drawing frame, always with a view to avoid any attacks on the plastic film 9.

These guides 88 consist of metal plates integral with the rails 11, arranged on either side of said rails, in the lower section of the drawing frame.

FIG. 5 also shows between the rails 11 and upstream of the drawing frame 16, a removable stop 26', represented as a thin mixed line. This second stop 26', similar to the upstream stop 26, enables pushing the last bale beyond the drawing frame 16 when the handling tool is installed as represented on FIG. 2, on a loading arm 30. The stop 26' co-operates with the handling tool as detailed previously for the stop 26.

If the handling tool 6 is installed on the lifting arms of a tractor, as represented on FIG. 1, the last bale can be cleared while interposing a space whose length corresponds to that of the bales between the pusher 25 and the face 2' of the bale that is inside the drawing frame 16. Then the sheathing procedure is performed as detailed previously.

What is claimed is:

1. A method for sheathing bales of plants into a tubular plastic film forming a sheath, using a carrier that moves as the sheath is being filled, comprising the steps of:

transporting a bale using a transport vehicle fitted with a handling tool having a plurality of spindles;

laying the bale on the carrier, upstream, in a direction of movement into the sheath, of supports of a drawing frame enabling storage of the tubular plastic film;

pushing the bale inside the sheath, so that the bale rests against a previously placed bale; and moving the carrier by a distance that matches the length of the bale, wherein said pushing step comprises pushing the bale using the handling tool equipped with a pusher-ejector device against a stationary bale previously pushed into the sheath, movement of the pusher-ejector device being in a direction of forward movement of the transport vehicle, to cause a simultaneous reactionary movement of the transport vehicle in a reverse direction, said movement of the transport vehicle in the reverse direction causing the carrier to simultaneously move in the reverse direction over a distance corresponding at least to the length of the bale.

2. A bale sheathing system comprising:

a tubular plastic film forming a sheath for sheathing bales of plants;

a movable carrier for carrying said bales;

a transport vehicle for transporting said bales;

a handling tool carried by said transport vehicle, said handling tool comprising:

a frame having means for fastening to one of a three point coupling system of the transport vehicle and a loading arm arranged at a front of the transport vehicle;

at least one pair of spindles mounted on the frame;

a pusher-ejector device integral with the frame, said pusher-ejector device having a pusher and being upstream, in a direction of forward movement of the transport vehicle, of the at least one pair of spindles; and means for moving said pusher from a first position so that the pusher is immediately adjacent a first end of said at least one pair of spindles, to a second position so that the pusher is immediately adjacent a second end of said at least one pair of spindles, movement of the pusher being in a direction of forward movement of the transport vehicle, so that movement of said pusher to said second position causes said pusher to push a first bale inside the sheath against a stationary second bale previously pushed into the sheath, so that the first bale rests against the second bale, movement of the first bale against the second bale causes a simultaneous reactionary movement of the transport vehicle in a reverse direction, said movement of the transport vehicle in the reverse direction causes the carrier to simultaneously move in the reverse direction over a distance corresponding at least to a length of one of said bales.

3. The bale sheathing system according to claim 2, wherein the movable carrier further comprises:

a base plate having a plurality of rails that extend over a length equal to at least twice a length of one of said bales, each said plural rails having a rail extension, each said rail extension having a first end connected to one of said plural rails;

an articulated stop between said plural rail extensions, said stop being articulated at a second end of said plural rail extensions about a horizontal and transverse axis;

an elastic member maintaining said stop in a protruding first position and enabling said stop to automatically retract to a second position when a bale is placed on the base plate, wherein said stop has a first end downstream, in a direction of forward movement, of said horizontal and transverse axis, and wherein said handling tool further comprises a crosspiece beneath the frame, said first end of said stop engages said crosspiece when a bale is ejected by the pusher so that the carrier and the transport vehicle are simultaneously moved in the reverse direction.

4. The carrier according to claim 3, further comprising a second removable stop between the plural rails, upstream of the sheath, that enables sheathing of a last placed bale.

5. The carrier according to claim 3, wherein an upstream section of the base plate forms a second frame articulated around a transversal horizontal axis, said second frame is retractable and lockable using tension rods and comprises, a chassis of said carrier and anchoring means cooperating with the three-point coupling system of the transport vehicle.

6. The carrier according to claim 3, further comprising:

a drawing frame having supports for storing the sheath; and guides for centering and guiding the bale during insertion into the drawing frame in order not to damage the sheath stretched between the supports of said drawing frame, said guides being upstream of an inlet of the drawing frame, at the plural rails of the carrier.

7. The carrier according to claim 3, wherein when said carrier is in an active sheathing position, a chassis of the carrier is configured in order to place the rails used for supporting and guiding the bales on a tilted plane situated close to the ground, at a height compatible, upstream, with the lifting capacity of the bales of the transport vehicle when the transport vehicle is fitted with a handling tool fixed directly on the three-point lifting system, and downstream, at less than ten centimeters above the ground.

8. The carrier according to claim 3, wherein a length LS of the base plate of the carrier extending between an inlet of a drawing frame for storing the sheath and an active face of the stop is substantially greater than a length of a bale increased by a distance between the pusher and an active face of the crosspiece situated below the frame of said tool and that co-operates with said active face of the stop.

9. The carrier according to claim 8, wherein a length LR of the quiding rails is approximately twice and a third of the length of said bale, said rails extending downstream of a middle axis of the drawing frame, over a length equal to approximately one third of said length LR.

10. The handling tool according to claim 2, wherein the pusher-ejector device comprises a pair of compasses and a hydraulic actuator for extending the pair of compasses, causing the pusher-ejector device to move over a distance that is at least equal to the length of the bale, in order to eject the bale from the at least one pair of spindles, and to simultaneously move, in the reverse direction, the transport vehicle and the sheathing carrier by the distance that is at least equal to the length of the ejected bale.

11. The handling tool according to claim 10, wherein the pair of compasses comprise:

a first leg having a length approximately equal to a width of the bale, the first leg is articulated at a first end on an axle integral with the frame; and a second leg having first and second ends, the first end of the second leg being articulately connected to a second end of the first leg, the second end of the second leg being connected to the pusher-ejector device, the pusher-ejector device being centered with respect to a middle vertical plane of the at least one pair of spindles, the actuator moving the first leg causing the second leg to pivot and extend so that the pusher-ejector device remains approximately centered on a longitudinal axis of the transport vehicle throughout a movement of the pusher-ejector device.

12. The handling tool according to claim 11, further comprising a chain that reels around a circular sector of a pulley-pinion and that extends around an articulation axis at the second end of the first leg, the circular sector being connected to the first end of the second leg, a first end of the chain being integral with the frame at a point that enables the displacement of the pusher-ejector device along a line that corresponds to the longitudinal axis of the transport vehicle.

13. The handling tool according to claim 12, wherein the chain is a roller chain.

14. The handling tool according to claim 2, wherein the frame further comprises a cross piece that serves as a marker with respect to the ground to enable positioning of the frame during spindling of a bale to be spindled, in order to place said bale to be spindled with respect to the frame, the cross piece in cooperation with a stop provided on the carrier being a means for pulling and driving the carrier during ejection of the bale.

15. The handling tool according to claim 2, wherein the transport vehicle is a farming tractor.

16. The handling tool according to claim 13, wherein the chain is a double roller chain.

* * * * *

UNITED STATES PATENT AND TRADEMARK OFFICE
CERTIFICATE OF CORRECTION

PATENT NO.    : 6,513,307 B1
DATED         : February 4, 2003
INVENTOR(S)   : Gerard Lucas Page 1 of 1

It is certified that error appears in the above-identified patent and that said Letters Patent is hereby corrected as shown below:

<u>Title page,</u>
Amend item [22] to read as follows:
-- [22]  PCT filed: October 29, 1998 --.

Also add items [86], [87] and [30] as follows:
-- [86] PCT No.: PCT/FR98/02324
§371 (c)(1), (2), (4) Date: July 14, 2000

[87] PCT Pub. No.: WO99/22585
PCT Pub. Date.: May 14, 1999

[30] Foreign Application Priority Data,
Oct. 30, 1997   (FR) .............................. 97/13885
Aug. 11, 1998   (FR) .............................. 98/10362 --.

Signed and Sealed this

Twenty-seventh Day of May, 2003

JAMES E. ROGAN
*Director of the United States Patent and Trademark Office*